3,310,862

PROCESS FOR FORMING NIOBIUM-STANNIDE SUPERCONDUCTORS

Lloyd R. Allen, Belmont, Mass., assignor, by mesne assignments, to National Research Corporation, a corporation of Massachusetts No Drawing. Filed July 10, 1962, Ser. No. 208,937
5 Claims. (Cl. 29—155.5)

This invention relates to the fabrication of superconducting members—sheet, rod, wire and foil containing longitudinally continuous paths of superconducting material for carrying electric current and providing magnetic field shielding. One of the approaches to obtaining high current densities in superconducting members is to laminate thin films of superconducting material between layers of insulating material or form thin coatings of superconducting material on wire, as taught in the copending applications, S.N. 193,281 filed May 8, 1962, and S.N. 102,593, filed Apr. 12, 1961 now abandoned. In both of these copending applications, the superconducting material $Nb_3Sn$ is employed, with niobium as the insulator. Layers of tin are bonded on the niobium base. The assembled materials are heated to cause diffusion and reaction at the niobium tin interfaces to produce the $Nb_3Sn$ layers. The methods of bonding the tin to the niobium are electroplating in one instance and cold working in the other.

It is an object of the instant invention to provide a chemical technique of bonding tin to niobium which will be a suitable alternative to the electrochemical and mechanical techniques of the above copending applications.

It is a further object that the metal stock produced thereby will be suitable for heating at elevated temperatures to produce the diffusion layers of $Nb_3Sn$ at the niobium tin interfaces.

The oxide layers occurring at the surface of the niobium base prevents the tin from evenly wetting the niobium. In accord with the instant invention a reducing agent is alloyed with the tin to remove the oxide. The tin can then wet the niobium surface evenly upon subsequent heating. That this technique affords salutary results is demonstrated by the following nonlimiting example:

*Example*

An alloy consisting of 2% magnesium and the remainer tin was prepared in a vacuum furnace and then rolled into thin foil. The resultant foil was sandwiched between two sheets of niobium foil, each .002″ thick. The sandwich was heat treated in a vacuum furnace at 970° C. for 90 minutes. A sample .059″ wide was cut from the sandwich and tested for critical current in a magnetic field of 13 kilogauss at liquid helium temperatures. The observed critical current was 60 amperes.

The mechanism of this treatment is believed to be a chemical reaction of the magnesium with the oxide layer on the niobium, thereby cleaning the niobium surface so that the tin will wet it at elevated temperature to form a uniform layer bonded to the niobium. This bond withstands subsequent heat treatment to permit the formation of a uniform layer of $Nb_3Sn$ at the niobium tin interface. Excess magnesium distills off in the subsequent vacuum treatment and does not affect superconductivity of the finished product. Other reducing agents can be used in place of magnesium. The elements of Group II of the Periodic Table, the alkaline earth metals, and their compounds are preferred.

It would also be thermodynamically feasible to use Mischmetall, a commercially available mixture of rare earths. As for alkaline earth compounds, silicides are especially preferred. The compounds Mg Si and Ca Si are widely used reducing agents. In this particular case, any of the compound $Nb_3Si$ which may be incidentally formed in addition to alkaline earth oxides in the course of the reducing reaction would not be harmful. Indeed, $Nb_3Si$ is also a superconductor having properties similar to those of $Nb_3Sn$.

The niobium base is relatively thick compared to the tin alloy layers. The niobium base provides the ductility of the finished product and the $Nb_3Sn$ layer, formed at the niobium tin interface, is thin enough to flex with the base. This overcomes the limitation of brittleness which has limited the use of $Nb_3Sn$ in superconducting members in the past. The niobium base is preferably pure niobium. However, it may comprise another ductile material with a niobium coating. The finished product can be provided with outer coatings of copper and plastic insulation to prevent short circuiting between adjacent members as in magnet windings and the like.

The present invention accordingly comprises the above process involving the several steps and the relation of the steps to each other which have been exemplified in the above disclosure and the scope of the application of which which will be indicated in the claims. It is intended that all matter contained in the above description shall be interpreted as illustrative and not in a limiting sense.

What is claimed is:

1. An improved process of manufacturing elongated niobium-stannide superconductor foils for winding into superconductor electric circuit components such as electromagnetic coils and the like comprising the steps of providing a tin foil which includes as an alloying addition, a reducing agent selected from the group consisting of alkaline earths and rare earths and their compounds, providing a niobium foil, rolling the foils together to produce a composite foil, heating the composite foil to reaction temperature to form $Nb_3Sn$ at the niobium-tin interface.

2. The process of forming superconductive niobium stannide on the surface of an elongated niobium body by reacting with said niobium surface a reducing agent selected from the group consisting of alkaline earths, rare earths, and their compounds and then holding molten tin in contact with said freshly reduced surface and heating the surface to form a diffusion coating of the stannide on the niobium body, then bending the body into a desired shape.

3. The improved process of claim 1 wherein the reducing agent is calcium silicide.

4. The improved process of claim 1 wherein the reducing agent is magnesium silicide.

5. The improved process of claim 1 wherein the reducing agent is magnesium.

References Cited by the Examiner

UNITED STATES PATENTS

| | | | |
|---|---|---|---|
| 2,240,055 | 4/1941 | Sager et al. | 148—127 |
| 2,417,760 | 3/1947 | Keene | 148—127 |
| 2,445,858 | 7/1948 | Mitchell et al. | 29—194 |
| 2,745,172 | 5/1956 | Townsend | 29—194 |
| 2,793,949 | 5/1957 | Imich | 75—135 |
| 2,829,993 | 4/1958 | Myer et al. | 148—182 |
| 2,958,836 | 11/1960 | McMahon | 338—32 |
| 3,084,041 | 4/1963 | Zegler et al. | 75—135 |

OTHER REFERENCES

Miller, Tantalum and Niobium, 1959, pages 638 and 639, published by Academic Press, Inc., 111 Fifth Avenue, New York 3, N.Y.

DAVID L. RECK, *Primary Examiner.*

HYLAND BIZOT, *Examiner.*

R. O. DEAN, *Assistant Examiner.*